United States Patent
Connolly et al.

[11] Patent Number: 6,005,737
[45] Date of Patent: Dec. 21, 1999

[54] MAGNETIC TAPE DRIVE HAVING IMPROVED SERVO CONTROL

[75] Inventors: Maura Patricia Connolly, County Westmeath, Ireland; William Jude O'Kane, County Derry, United Kingdom

[73] Assignee: Seagate Technology, Inc., Scotts Valley, Calif.

[21] Appl. No.: 08/990,586

[22] Filed: Dec. 15, 1997

Related U.S. Application Data

[60] Provisional application No. 60/044,782, Apr. 24, 1997.

[51] Int. Cl.$^6$ .................................................. G11B 21/02
[52] U.S. Cl. ..................... 360/75; 360/77.12; 360/78.02
[58] Field of Search ................................. 360/75, 77.12, 360/78.02

[56] References Cited

U.S. PATENT DOCUMENTS

5,262,908  11/1993  Iwamatsu et al. ................... 360/77.12
5,946,156  8/1999  Schwarz et al. ......................... 360/75

*Primary Examiner*—Aristotelis M. Psitos
*Assistant Examiner*—Dan I. Davidson
*Attorney, Agent, or Firm*—Kinney & Lange, P.A.

[57] ABSTRACT

A magnetic tape drive has a magnetic head, a magnetic tape medium, and a servo controller. The magnetic head has N servo readers and a plurality of transducing heads for transducing with separate data tracks in each range. The magnetic tape medium is proximate the magnetic head, and has first and second servo tracks and 2N−1 ranges. Each range has a plurality of parallel data tracks. The servo controller, which is responsive to servo read signals produced by two of the servo readers, positions the magnetic head so that the plurality of transducing heads transduce with one of the 2N−1 ranges. Servo read signals produced by one of the N servo readers reading from the first servo track and a different one of the N servo readers reading from the second servo track define one range, while servo read signals produced by two servo readers reading from one of the first and the second servo tracks define 2(N−1) of the ranges.

3 Claims, 8 Drawing Sheets

MAGNETIC TAPE DRIVE HAVING IMPROVED SERVO CONTROL

CROSS-REFERENCE TO RELATED APPLICATION

This application claims priority of Provisional Application No. 60/044,782 filed Apr. 24, 1997 for "Dual Throated, Single Coil, Thin Film Inductive Write Head for Improved Servo Performance" by Maura P. Connolly and William J. O'Kane.

BACKGROUND OF THE INVENTION

The present invention relates generally to the field of electronic data storage. In particular, the present invention relates to a multiple-throated, single-coil, inductive servo writer for simultaneously writing multiple servo tracks on a magnetic tape medium.

Data are stored on magnetic tapes in parallel tracks that extend in the direction of the length of the magnetic tape. Historically, separate read and write heads existed for each distinct data track. Each of these read and write heads remained stationary while the tape scrolled past them. In this system, write-wide, read-narrow methodologies were sufficient to ensure that the read heads remained on-track during read-back.

To increase data densities on magnetic tapes, new head assemblies were developed that moved across the width of the magnetic tape, such that each read and write head in the head assembly would have access to multiple data tracks. To accurately position this type of head assembly, these tape drives relied upon servo schemes that had been used to control head positions in rigid disc applications. By using servo tracks, the head assembly could be placed in multiple positions or servo ranges across the width of the magnetic tape. The servo schemes used servo tracks consisting of a series of alternating magnetic moments on the tape. For instance, a conventional two servo scheme uses two servo tracks that are read by some number of servo readers to obtain multiple servo ranges across the width of a track. The number of available servo ranges in a conventional two servo scheme is 2(N−1), where N is the number of servo readers. Hence, a conventional two servo scheme employing four servo readers will provide six ranges of positions.

The center of each range is identified by two adjacent servo readers being positioned such that exactly one half of each servo reader is located directly above the same servo track. The border between ranges is located half way between centers. When the servo read signals from the corresponding servo readers are unequal, the servo loop moves the servo readers toward the center position. Each range of positions represents a set of data tracks, with each data track in a set associated with its own read head. Thus, if there are eight data read heads, a single servo range will be associated with eight data tracks.

In order to increase data density by increasing the number of tracks on a tape, it has been suggested that non-adjacent servo read heads, reading two separate servo tracks, could be used to define additional servo ranges. In the above stated example, one extra range could be gained if the read signal from separate servo tracks were used simultaneously to define the new range. The new range would be defined by the first servo read head covering one-half of the first track and the fourth servo read head covering one-half of the second servo track.

In such a system, however, any discrepancy in the two servo tracks results in tracking problems. In particular, phase shifts between the alternating patterns in the two servo tracks make it impossible to determine the head assemblies' position within the added range. In fact, a phase shift between the two servo tracks can cause ringing, where the head assembly oscillates across the range without finding a fixed range center. This oscillation occurs because the phase shift introduces an oscillating inequality between the read signals of the two servo heads.

Currently, there are two methods in the prior art for producing parallel servo tracks. In one method, the servo tracks are written by one servo writer which writes one servo track before being moved a small distance across the width of the magnetic tape to write additional servo tracks. In this method, small changes in the tape speed, or flutter, will cause the transitions in the servo tracks to be out-of-phase with each other. In the second method of creating parallel servo tracks, independent servo writers are used in parallel. However, in this method minute differences between the independent heads cause the transitions in the servo tracks to be out of phase. Even heads fabricated on the same wafer will have variations in thickness of the individual layers that can cause a phase shift between the servo tracks.

BRIEF SUMMARY OF THE INVENTION

The present invention is an inductive servo writer for simultaneously writing multiple servo tracks on a magnetic tape medium. The servo writer comprises a magnetic top pole, a magnetic bottom pole, and a conductive coil. A first end of the top pole contacts a first end of the bottom pole, and a second end of the top pole comprises at least two pole tips. The pole tips are separated from each other by a recessed area in the second end of the top pole. Each pole tip defines a write gap between the respective pole tip and the second end of the bottom pole. The conductive coil extends between the top and bottom poles and is capable of simultaneously creating a magnetic field across all the write gaps.

At least two parallel servo tracks can be simultaneously written on a magnetic tape medium by the at least two write gaps of the servo writer, such that the alternating patterns on the two tracks are completely in phase with one another. Since the two servo tracks are in phase, a preferred embodiment of the present invention uses one servo read signal from at least two servo tracks to define at least one magnetic head position on the tape. The use of two separate servo tracks to define a position on the tape is made possible by the dual-gapped write head because the two servo tracks are written in phase, thus eliminating the ringing problems found in the prior art.

BRIEF DESCRIPTION OF THE DRAWINGS

FIG. 6c is a cross-sectional view of the servo writer of the present invention taken along line c—c of FIG. 6a.

FIG. 6d is a cross-sectional view of the servo writer of the present invention taken along line d—d of FIG. 6a.

DETAILED DESCRIPTION OF THE PREFERRED EMBODIMENTS

Figure 1:
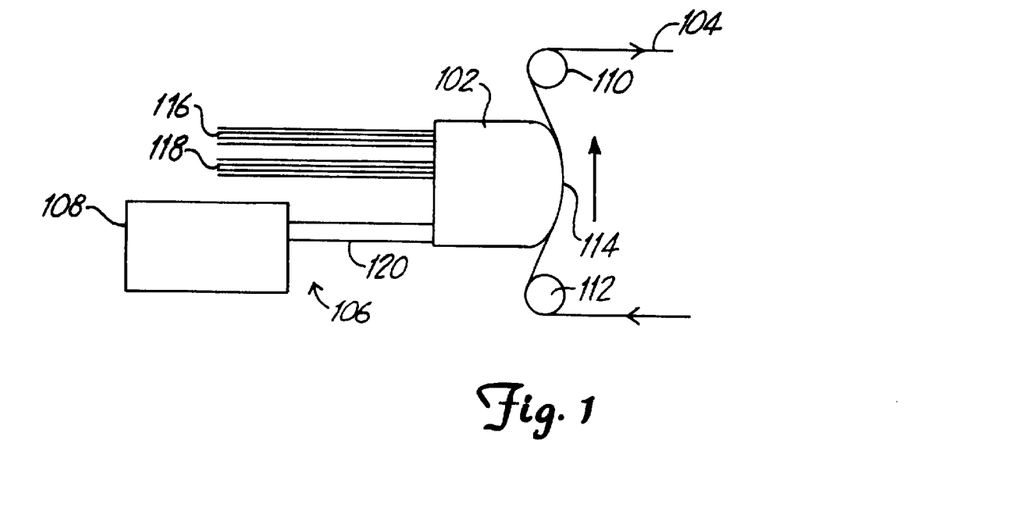
FIG. 1 is a top view of a magnetic tape drive showing a magnetic tape drive head assembly and a portion of magnetic tape.

FIG. 1 is a top view of a magnetic tape drive 100 that generally includes a magnetic head assembly 102, a magnetic tape 104, and a servo loop 106. A first magnetic tape guide 110 and a second magnetic tape guide 112 guide the magnetic tape 104 in place as the magnetic tape 104 scrolls past a tape bearing surface 114 of the head assembly 102. Although not illustrated in FIG. 1, a typical magnetic tape drive configuration includes a source, or pay-off, reel and a destination, or take-up, reel, around which each end of the magnetic tape 104 can be wrapped. As a motor causes the destination reel to circle, the magnetic tape 104 will unwrap off of the source reel, scroll over the first tape guide 110, scroll past a tape bearing surface 114 of the head assembly 102, scroll over the second tape guide 112, and finally wrap onto the destination reel. The first and second tape guides 110 and 112 are generally both located on the same side of the magnetic tape and are both generally located on the opposite side of the magnetic tape 104 as the head assembly 102.

Magnetically-encoded information is stored on the magnetic tape 104 by means of magnetic impulses. The magnetic tape contains multiple rows of data such that the magnetic tape drive 100 can read data from or write data to multiple rows on the magnetic tape 104. The magnetic tape 104 also contains servo information to be used by the magnetic tape drive 100 to properly position the head assembly 102.

The head assembly 102 contains multiple data read heads, data write heads, and servo read heads to read magnetic impulses from and write magnetic impulses to the magnetic tape 104. The servo read heads are used to identify the current position of the head assembly 102, so that the magnetic tape drive 100 can move the head assembly to the proper position. The data read heads and data write heads operate respectively to read data from and write data to the magnetic tape 104. Each data read head is associated with a corresponding read output 116, and each data write head is associated with a corresponding write input 118. The read outputs 116 and write inputs 118 are used so that any external circuitry can communicate with the head assembly 102. Similarly, each servo read head is associated with a corresponding servo read output 120. The servo read outputs 120 allow a servo controller 108 to communicate with the head assembly 102. The servo loop 106 is comprised of the servo controller 108, the servo read outputs 120, and the servo read heads.

Figure 2:
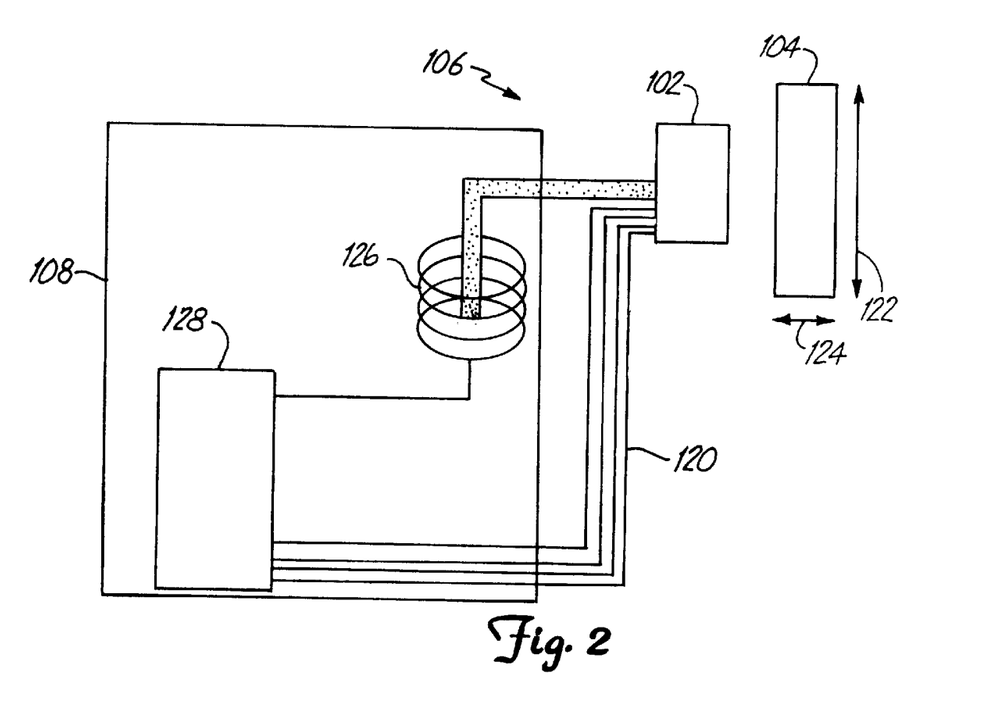
FIG. 2 is a diagram of a servo loop in the magnetic tape drive of FIG. 1.

FIG. 2 shows a more detailed diagram of the servo loop 106. The servo read outputs 120 connect the servo controller 108 to the head assembly 102. The servo controller 108 includes a voice coil actuator 126 and a control circuit 128. The control circuit 128 consists of a series of comparator circuits that compare the servo read outputs 120 to identify the current location of the head assembly 102. The voice coil actuator 126 takes the output of the control circuit 128 and accordingly positions the head assembly 102 along the width 122 of the magnetic tape 104.

Figure 3:
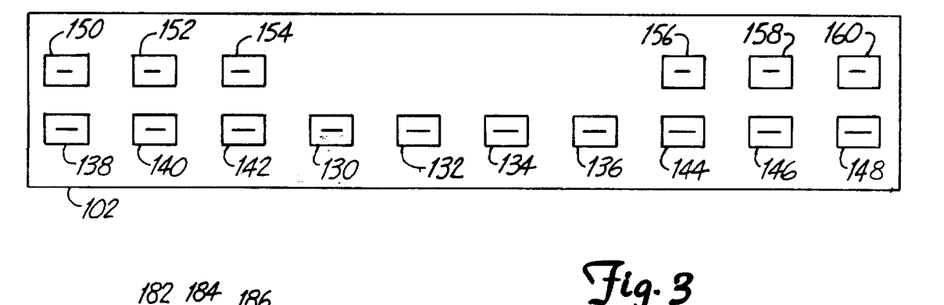
FIG. 3 is a view of the tape bearing surface of magnetic tape drive head assembly.

FIG. 3 is a diagram of one embodiment of the head assembly 102 of the current invention having four servo read heads 130, 132, 134, and 136, six data read heads 138, 140, 142, 144, 146, and 148, and six data write heads 150, 152, 154, 156, 158, and 160. The head assembly 102 is arranged such that the servo read heads 130, 132, 134, and 136 are adjacent to one another and in the center of the head assembly 102. The data read heads 138, 140, and 142 are positioned adjacent to one another, with data read head 142 being adjacent to servo read head 130. The data read heads 144, 146, and 148 are positioned adjacent to one another with data read head 144 being adjacent to servo read head 136. For each of the data read heads 138, 140, 142, 144, 146, and 148, the respective data write head 150, 152, 154, 156, 158, and 160 is positioned in an adjacent row. Workers skilled in the art will recognize that other configurations of servo and data heads that vary in number and location are possible.

Figure 4A:
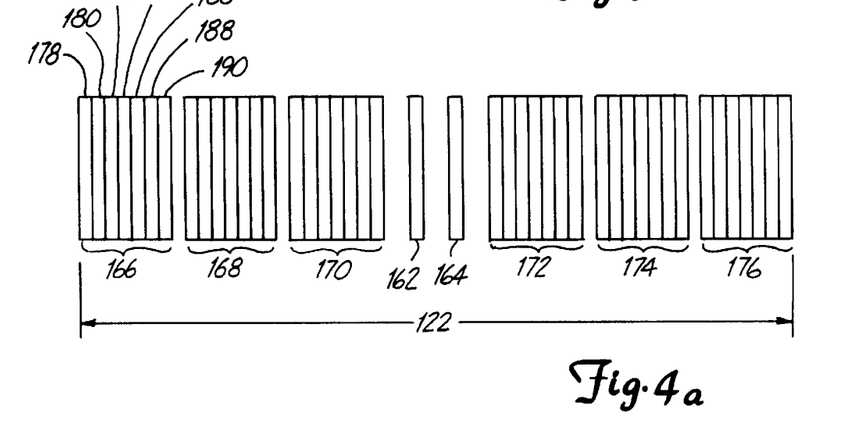
FIG. 4a is a diagram of the data and servo track layout of servo-encoded magnetic tape.

FIG. 4a is a diagram of the encoded magnetic tape 104 that is readable by the embodiment of the head assembly shown in FIG. 3. FIG. 4a shows the relative placements of servo tracks 162 and 164 and data bands 166, 168, 170, 172, 174, and 176 along the width 122 of the magnetic tape 104. The servo tracks 162 and 164 are parallel to one another and to the data bands 166, 168, 170, 172, 174, and 176 and run perpendicular to the width 122 of the magnetic tape 104. Each data band 166, 168, 170, 172, 174, and 176 contains multiple data tracks 178, 180, 182, 184, 186, 188, and 190 and has a corresponding data read head 138, 140, 142, 144, 146, and 148. The combination of the two servo tracks 162 and 164; the four servo read heads 130, 132, 134, and 136; and the servo controller 108 allow each data read head 138, 140, 142, 144, 146, and 148 to access the seven data tracks 178, 180, 182, 184, 186, 188, and 190 contained within the corresponding data band 166, 168, 170, 172, 174, or 176. Therefore, in this embodiment, 42 data tracks are available.

Figure 4B:
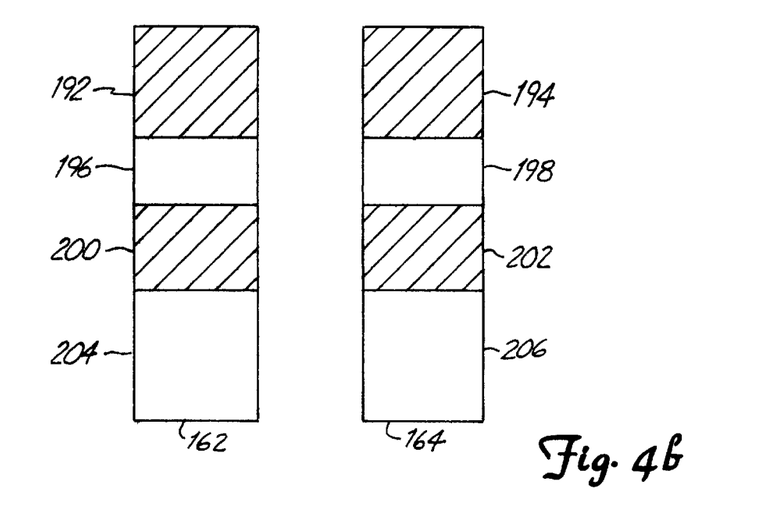
FIG. 4b is an enlargement of the servo tracks of FIG. 4a showing the servo bursts of alternating polarity.

FIG. 4b is an enlargement of the servo tracks 162 and 164 of FIG. 4a that shows that on servo track 162, alternating servo bursts 192, 196, 200, and 204 such that servo bursts 192 and 200 are of the same polarity and opposite to the polarities of servo bursts 196 and 204. Similarly servo track 164 has servo bursts 194, 198, 202, and 206, the polarity of which corresponds with servo track 162. In other words, servo burst 192 and 194 are of the same polarity. Because the servo tracks were written by the servo writer 100 of the present invention, the transitions in servo pulses of the servo tracks 162 and 164 are completely in phase with one another. Therefore although each servo pulse 192, 196, 200, and 204 may be of different lengths, corresponding servo pulses 192 and 194 are of identical length. Similarly, each of the remaining corresponding servo pulses are of identical length. Since the servo readers 130, 132, 134, and 136 only search the servo tracks 162 and 164 for a transition in polarity of servo pulses, the length of the servo pulse is irrelevant as long as the corresponding servo pulses of the two servo tracks are of the same length.

Figure 5A:
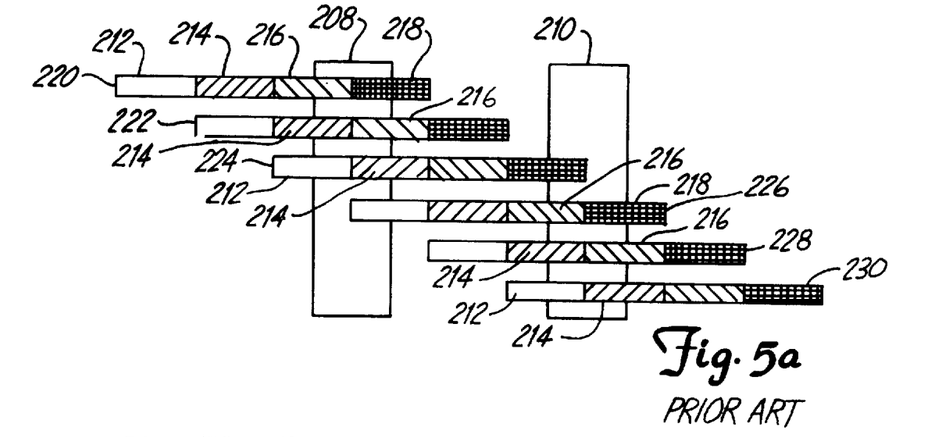
FIG. 5a is a diagram of the available servo ranges of the magnetic tape drive head assembly of the prior art.

To illustrate how the servo loop 106 positions the head assembly 102 to locate the seven individual data tracks 178, 180, 182, 184, 186, 188, and 190 accessible to a single data read head 138, 140, 142, 144, 146, or 148, reference is first made to a conventional two servo scheme of the prior art. FIG. 5a illustrates a conventional two servo scheme applied to a magnetic tape drive. The conventional two servo scheme employs two servo tracks 208 and 210 on a magnetic tape and four servo read heads 212, 214, 216, and 218 on a head assembly of the magnetic tape drive. In a conventional two servo scheme, the number of servo ranges available is 2(N−1), where N is the number of servo read heads. Thus, FIG. 5a illustrates four servo read heads to achieve six available servo ranges 220, 222, 224, 226, 228, and 230 for a magnetic tape drive. The number of servo ranges can be increased by increasing the number of servo read heads. Thus, five servo read heads will provide eight servo ranges, six servo read heads will produce ten servo ranges, etc.

As shown in FIG. 5a, the center of range 220 is identified by two adjacent servo readers 216 and 218 being positioned such that exactly one-half of each servo reader 216 and 218 is located directly above servo track 208. The borders of servo range 220 are defined by the center of servo reader 216 and the center of servo reader 218. Servo ranges 222, 224, 226, 228, and 230 are similarly defined, as is shown in the following chart:

| Servo Range | Servo Track | Servo Read Heads |
| --- | --- | --- |
| 220 | 208 | 216 & 218 |
| 222 | 208 | 214 & 216 |
| 224 | 208 | 212 & 214 |
| 226 | 210 | 216 & 218 |
| 228 | 210 | 214 & 216 |
| 230 | 210 | 212 & 214 |

Figure 5B:
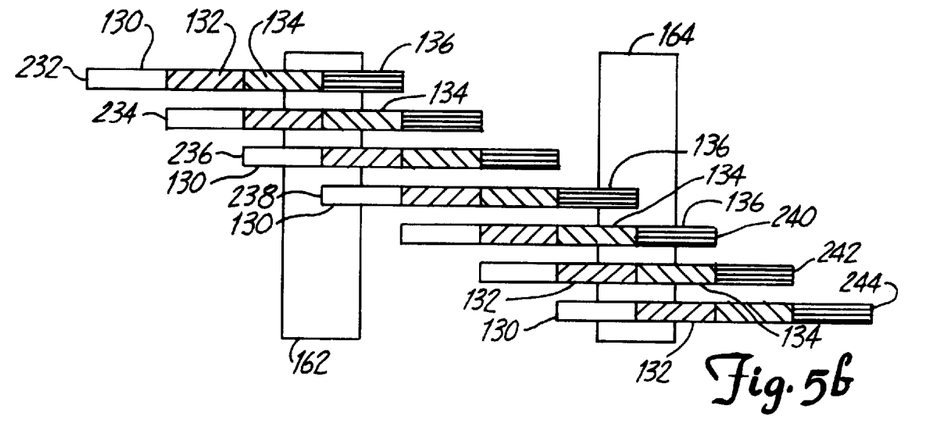
FIG. 5b is a diagram of the available servo ranges of the magnetic tape drive head assembly of the present invention.

FIG. 5b shows one advantage gained by the present invention: namely, the ability to access one additional servo range. In FIG. 5b, the head assembly 102 has the four servo read heads 130, 132, 134, and 136 and the magnetic tape 104 is encoded with the two servo tracks 162 and 164, as in a conventional two servo scheme. However, in the embodiment of FIG. 5b, seven possible servo ranges 232, 234, 236, 238, 240, 242, and 244 are achieved, as opposed to the six servo ranges available in the similar magnetic tape drive of the prior art illustrated in FIG. 5a. A center of the extra servo range 238 is defined by one-half of the servo read head 130 being directly over servo track 162 and one-half of servo read head 136 being directly over servo track 164. Otherwise, each center of the remaining six servo ranges 232, 234, 236, 240, 242, and 244 is similar to that defined in the prior art. As a result, the number of servo ranges available according to the present invention is 2N−1, rather than 2(N−1) available in conventional two servo schemes.

The following chart illustrates each of the servo ranges 232, 234, 236, 238, 240, 242, and 244 achieved by the present invention using four servo readers:

| Servo Range | Servo Track | Servo Read Heads |
| --- | --- | --- |
| 232 | 162 | 134 & 136 |
| 234 | 162 | 132 & 134 |
| 236 | 162 | 130 & 132 |
| 238 | 162 & 164 | 130 & 136 |
| 240 | 164 | 134 & 136 |
| 242 | 164 | 132 & 134 |
| 244 | 164 | 130 & 132 |

It will be appreciated that increasing the number of servo readers also increases the number of servo ranges. Hence, five servo readers will provide nine servo ranges (as opposed to eight in the prior art), six servo readers will provide eleven servo ranges (as opposed to ten in the prior art), etc. Hence, the present invention achieves one additional servo range over the number achieved by conventional schemes.

Figure 6A:
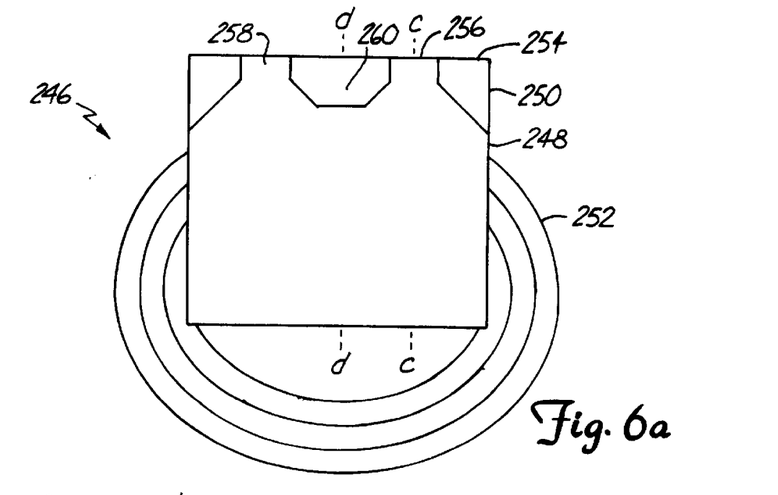
FIG. 6a is a top view of the servo writer of the present invention showing the magnetic top pole, magnetic bottom pole, and the conductive coil.

Because servo range 238 uses two separate servo tracks 162 and 164, it is important that the transitions in the two tracks be in phase with one another to eliminate any ringing of the head assembly 102 that might otherwise occur. In order to ensure that the servo tracks 162 and 164 are in phase with one another such that two servo readers 130 and 136 can servo off of the two separate servo tracks 162 and 164 simultaneously, an inductive servo writer 246 of FIGS. 6a through 6d is used. FIG. 6a is a top view of the servo writer 246 that shows a magnetic top pole 248, a magnetic bottom pole 250, and a conductive coil 252 that extends between the magnetic magnetic top pole 248 and the magnetic bottom pole 250. The magnetic top pole 248 is formed such that a first end of the magnetic top pole 248 contains two pole tips 256 and 258 along a tape bearing surface 254. The pole tips 256 and 258 are separated from each other by a recessed area 260. The width of recessed area 260 is X·(N−1) where X is the width of the servo track and N is the number of servo readers.

Figure 6B:
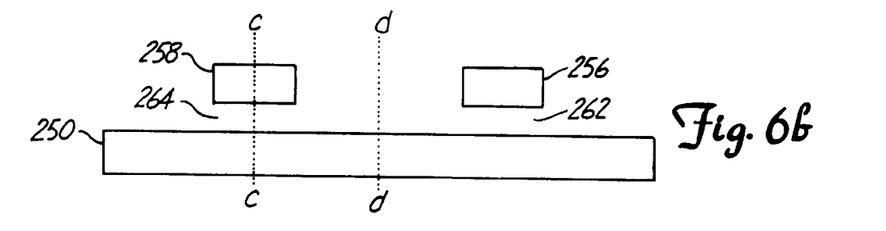
FIG. 6b is a view of the tape bearing surface of the servo writer of the present invention.
Figure 6C:
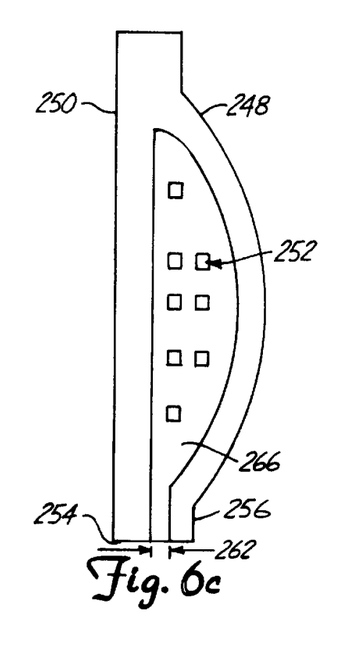
Figure 6D:
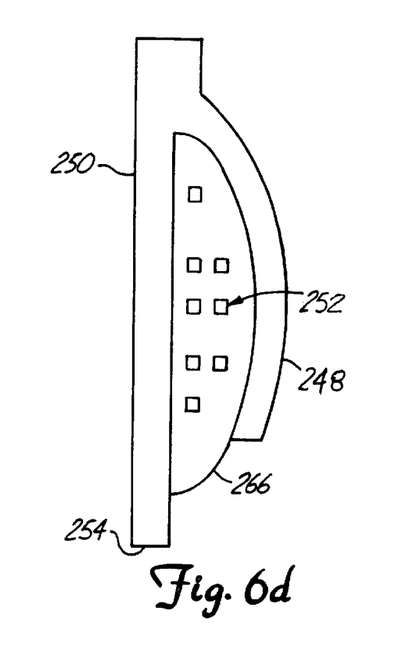

FIG. 6b is a view of the inductive servo writer 246 along the tape bearing surface 254. The magnetic top pole 248 is clearly positioned along the tape bearing surface 254 such that two write gaps 262 and 264 are formed by each of the pole tips 256 and 258 and the magnetic bottom pole 250. FIG. 6c is a cross-sectional view taken along line c—c in FIG. 6a. The plane of FIG. 6c intersects the tape bearing surface 254 at the center of the first pole tip 258 and is perpendicular to both a plane along the magnetic bottom pole 250 and a plane along the tape bearing surface 254. FIG. 6d is a cross-sectional view, parallel to the view of FIG. 6c, taken along line d—d in FIG. 6a which is at the center of the recessed area. The magnetic top pole 248 is shown recessed away from the tape bearing surface 254 so that no material of the magnetic top pole 248 contacts the tape bearing surface 254 of the inductive servo writer 246. Holding the inductive coils 252 in place between the magnetic top pole 248 and the magnetic bottom pole 250 is an insulator 266. The insulator 266 fills the entire hollow between the magnetic top pole 248 and the magnetic bottom pole 250 and extends to the tape bearing surface 254, forming write gaps 262 and 264. Along the cross-sectional view shown in FIG. 6d, the insulator 266 is left exposed beneath the recessed area 260 of the magnetic top pole 248.

The servo writer 246 operates by placing a current through the conductive coil 252, thereby causing a magnetic field to be generated across the first and second write gaps 262 and 264. The polarity of the written servo bursts of the servo track depends upon the direction of the current passing through the conductive coil 252. Because a single current is driven through the conductive coil 252, and because a single conductive coil 252 generates the magnetic field across both the first and second write gaps 262 and 264, the first and second write gaps 262 and 264 simultaneously write servo tracks on a magnetic tape. Because the first and second write gaps 262 and 264 are adjacent to one another, the two servo tracks written by the servo writer 246 will be parallel to one another, with transitions in a first servo track being in phase with transitions of the opposite servo track.

Figure 7A:
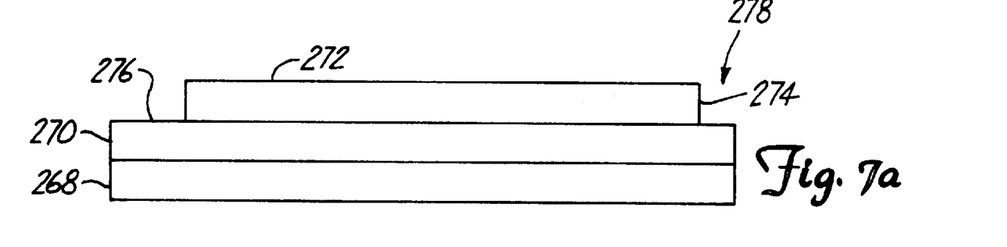
FIGS. 7a through 7l are cross-sectional views showing a method of forming the preferred embodiment of the present invention.
Figure 7B:
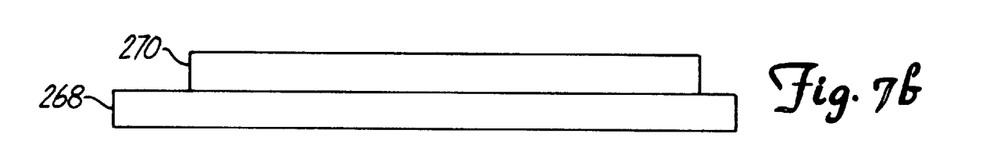
Figure 7C:
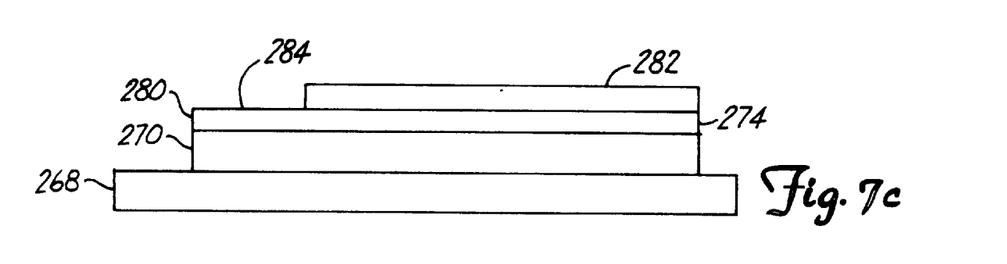
Figure 7D:
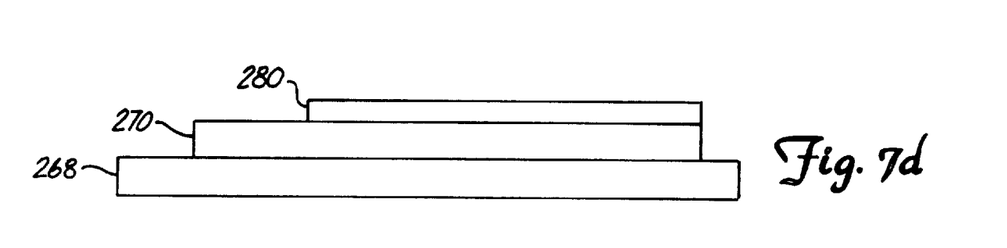
Figure 7E:
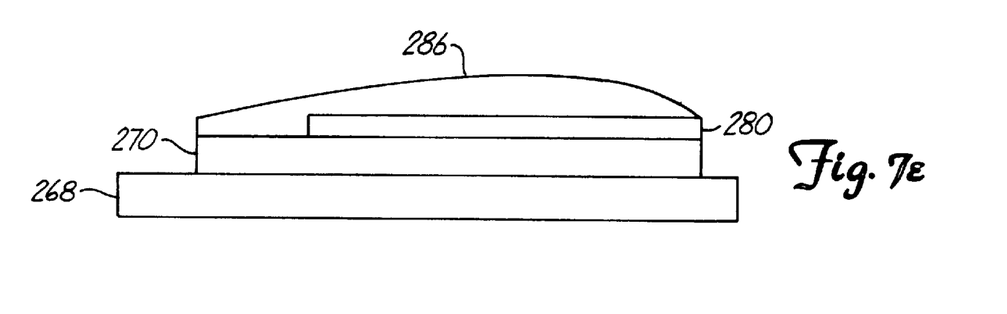
Figure 7F:
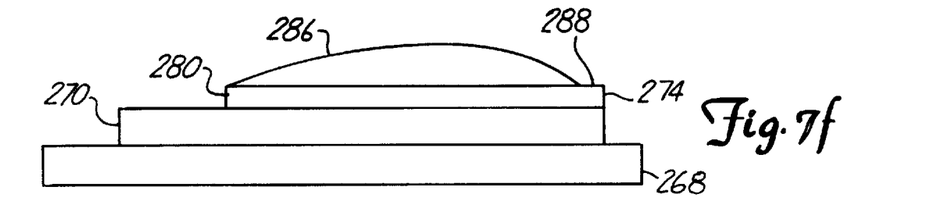
Figure 7G:
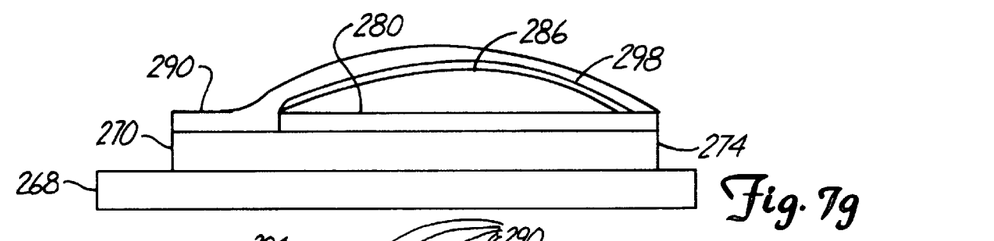
Figure 7H:
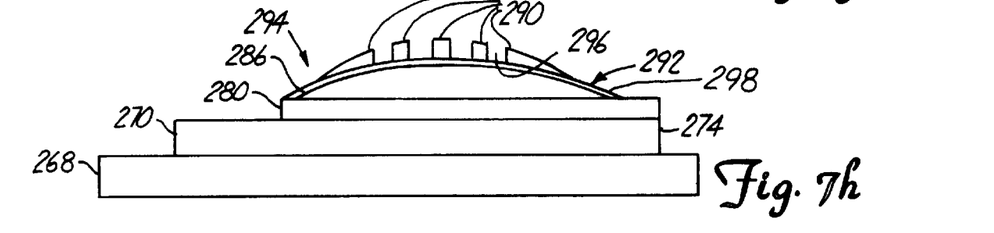
Figure 7I:
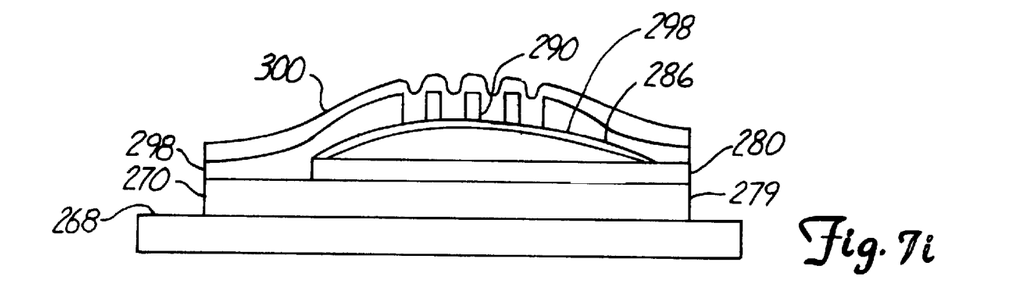
Figure 7J:
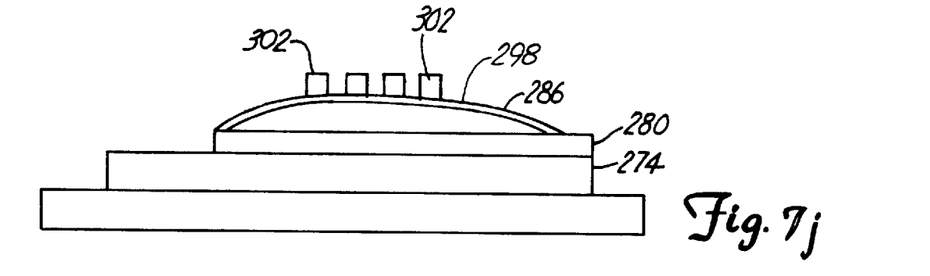
Figure 7K:
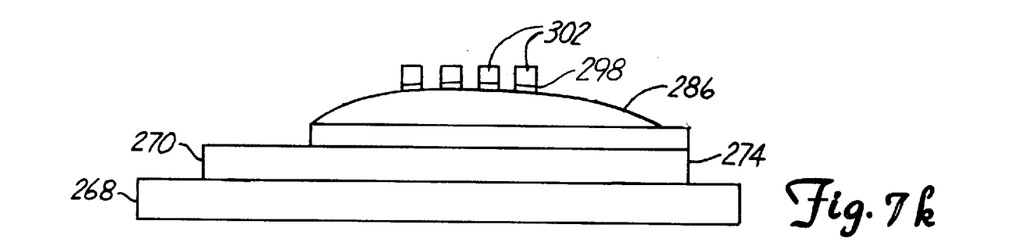
Figure 7L:
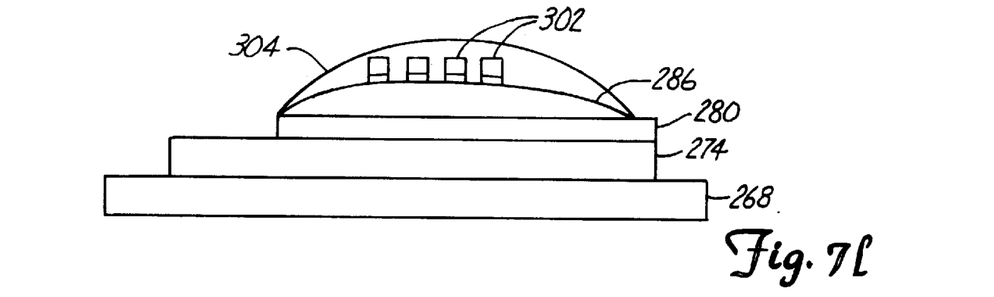
Figure 7M:
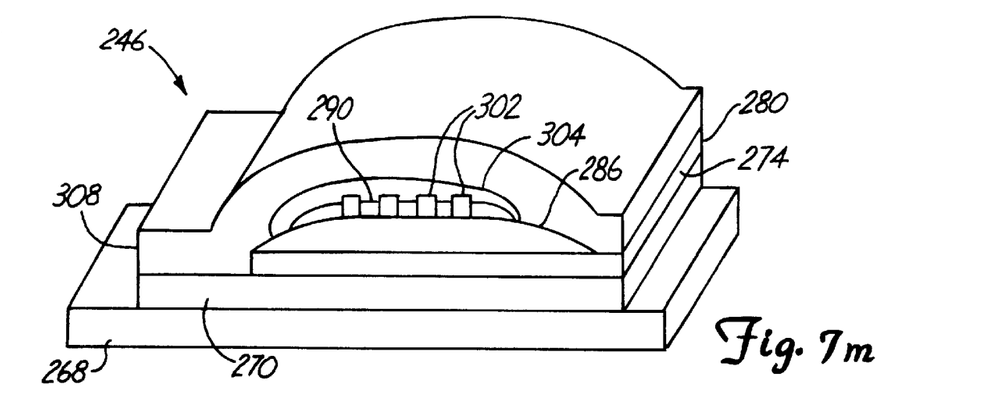
FIGS. 7m through 7o are perspective views showing a method of forming the preferred embodiment of the present invention.
Figure 7N:
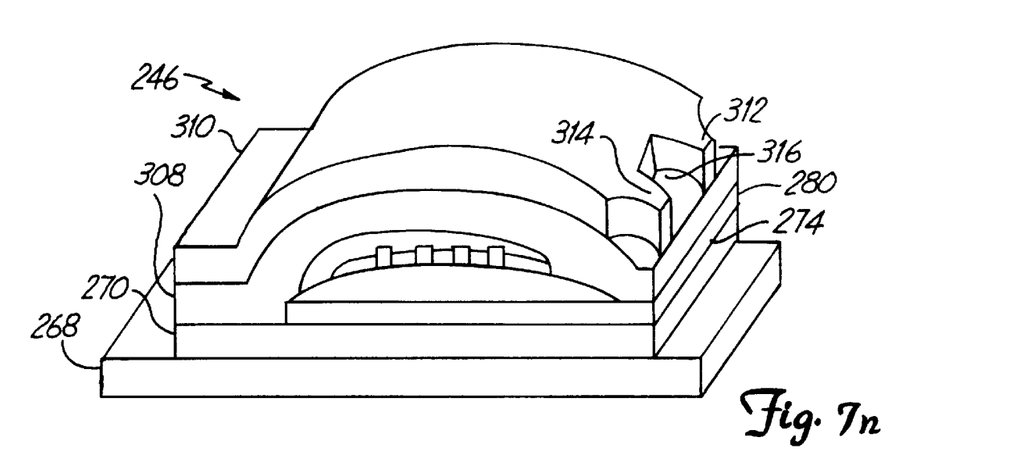
Figure 7O:
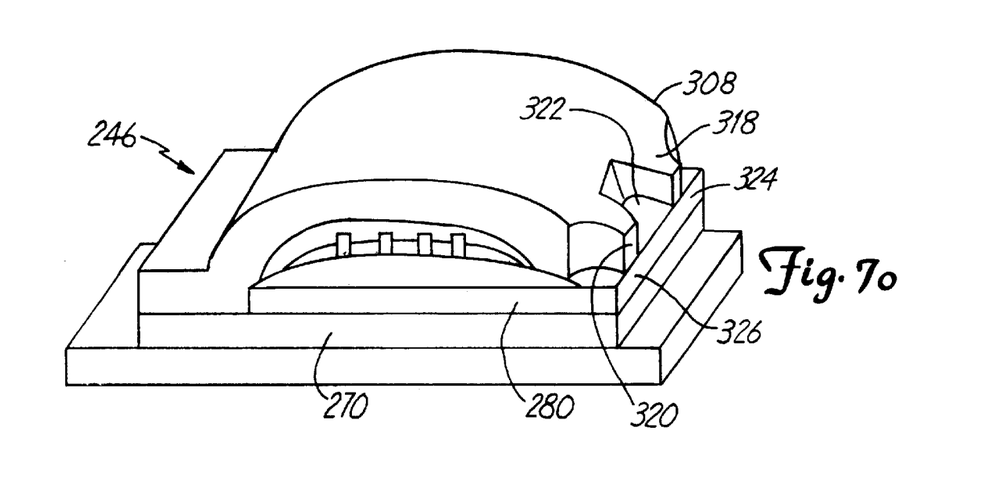

FIGS. 7a–7o illustrate a process of fabricating a preferred embodiment of the inductive servo writer 246 of the present invention. The cross-sectional views of FIGS. 7a–7l are taken from a plane perpendicular to the tape bearing surface 274 of the inductive servo writer 246. FIGS. 7m through 7o are perspective views of the inductive servo writer 246.

To construct the inductive servo writer 246, a magnetic bottom pole 270 is first deposited on a substrate 268 as shown in FIG. 7a. To pattern the magnetic bottom pole 270, a first photoresist 272 is deposited such that a first top surface 276 of bottom pole 270 adjacent to an edge opposite a tape bearing surface 274 and a second top surface 278 adjacent to the tape bearing surface 274 are left exposed. As shown in FIG. 7b, the first photoresist 272 and portions of the magnetic bottom pole 270 left uncovered by the first photoresist 272 are removed.

The substrate 268 is conventional and is preferably formed from a well known insulation material. The magnetic bottom pole 270 is preferably formed of NiFe permalloy or other magnetic material and has a thickness of about 3 to 5 $\mu$m. Cobalt or iron based magnetic materials may be used in place of permalloy.

As shown in FIG. 7c, a non-magnetic, first insulating material 280 is deposited onto the substate and patterned using a second photoresist 282. The second photoresist 282 is deposited on the first insulating material, and patterned to expose a top surface 284 of layer 180 that is adjacent to the edge opposite the tape bearing surface 274. The first insulating material 280 is preferably a layer of aluminum oxide having a thickness of 1 to 2 $\mu$m. As shown in FIG. 7d the exposed portion of insulating layer 280 is etched away and photoresist 282 is removed.

Next, as shown in FIG. 7e, a third layer of photoresist 286 is spin deposited over the first insulating material 280 and the magnetic bottom pole 270, and the portion of the third photoresist 286 that covers the magnetic bottom pole 270 and a portion of photoresist 286 that covers the top surface 288 of the insulating material 280 adjacent to the tape bearing surface 274 are removed (FIG. 7f). The third photoresist 286 is then baked hard leaving a layer of insulating photoresist.

As shown in FIG. 7g, a conductive seed layer 289 is deposited over layer 286 (for example to a thickness of about 0.1 $\mu$m) and a fourth photoresist layer 290 is deposited over seed layer 298 and magnetic bottom pole 270, and the first insulating material 280. Photoresist 290 is patterned to form openings or grooves 296 across the second photoresist 286 (FIG. 7h). As shown in FIG. 7i, conductive material 300 is deposited to a thickness of about 2 to 3 $\mu$m on photoresist layer 290 and on seed layer 298 in groves 296, the conductive material preferably being copper. The conductive layer adheres to seed layer 298, but not well to the photoresist. As shown in FIG. 7j, photoresist 290 is stripped off, leaving the conductive material 300 within the grooves 296, shorted by seed layer 298. Next, the conductive layer 300 and seed layer 298 are etched to remove about 0.1 to 0.2 $\mu$m of material, thereby removing the seed layer from between the separate conductive coils 302. As a result the conductive coils 302 remain with a thickness of preferably about 2 to 3 $\mu$m thick.

The next step, as shown in FIG. 7l, is to deposit an encapsulating insulating photoresist material 304 over the coils. The photoresist layer 304 is patterned to expose layer 280 and is baked to encapsulate the conductive coils 302 between layers 286 and 304. Preferably the overall thickness of the insulating layers and coils is about 7 to 10 $\mu$m. If additional coil layers are desired, the process of forming the coils is simply repeated.

As shown in FIG. 7m, a magnetic top pole 308 is next deposited on the servo writer 246 such that it contacts the magnetic bottom pole 270 at an end opposite the tape bearing surface 274 and contacts the first insulating material 280 at the end adjacent the tape bearing surface 274. The magnetic top pole is preferably formed of permalloy or other magnetic material, and is about 3 to 5 $\mu$m thick. As shown in FIG. 7n, the magnetic top pole 308 is patterned by depositing a seventh photoresist 310 on the magnetic top pole 308. The seventh photoresist 310 is shaped to form a first and a second protrusion 312 and 314 on the edge adjacent to the tape bearing surface 274 and a recessed area 316 between the first and second protrusions 312 and 314. The exposed portions of top pole 308 are then removed, such as by etching, and photoresist layer 310 is removed. FIG. 7o shows the final servo writer 246, after the seventh photoresist 310 has been removed, along with the portions of the magnetic top pole 308 that were left uncovered by the seventh photoresist 310. The final servo writer 246 has a first and a second protrusion 318 and 320 and a recessed area 322 between the first and second protrusions 318 and 320. Along the tape bearing surface 274 of the servo writer 246, a first write gap 324 is formed between the first protrusion 318 of the magnetic top pole 308 and the magnetic bottom pole 270. Similarly, a second write gap 326 is formed between the second protrusion 320 of the magnetic top pole 308 and the magnetic bottom pole 270. The thickness of the first and second write gaps 324 and 326 is preferably 1 $\mu$m to 2 $\mu$m.

Several advantages are gained by forming the first and second write gaps 324 and 326 on one servo writer 246. First, the single conductive coil 302 provides the magnetic field across the first and second write gaps 324 and 326 simultaneously, which would not result with a separate conductive coil for the first and second write gaps 324 and 326. By simultaneously creating a magnetic field across the first and second write gaps 324 and 326, the transitions in the resulting servo tracks 162 and 164 will be in phase with one another.

Second, the first and second write gaps 324 and 326 are located closer to one another on the wafer during fabrication, resulting in fewer differences in the layers of the servo writer 246. By constructing the first and second write gaps 324 and 326 identical to one another, identical performance is achieved by the two write gaps, resulting in less degradation in results of the servo writer 246. If two servo writers were used, rather than one with two heads, each write head would be further apart from the other at the wafer level (before cutting up the wafer into individual heads) resulting in more differences in the component layers of the servo writers.

Although the invention is described in connection with a dual throated write head, the process can be extended to provide any desired number of heads.

Workers skilled in the art will recognize that more than two write gaps may be included on the servo writer, such that more than two servo tracks are written. Similarly, the number of servo writers can be varied.

Although the present invention has been described with reference to preferred embodiments, workers skilled in the art will recognize that changes may be made in form and detail without departing from the spirit and scope of the invention.

We claim:

1. A magnetic tape drive comprising:
 a magnetic head having N servo readers and a plurality of transducing heads for transducing with separate data tracks in each range,
 a magnetic tape medium proximate the magnetic head, the tape medium having first and second servo tracks and 2N−1 ranges, each range having a plurality of parallel data tracks, and
 a servo controller responsive to servo read signals produced by two of the servo readers to position the magnetic head so that the plurality of transducing heads transduce with one of the 2N−1 ranges, 2(N−1) of the ranges being defined by servo read signals produced by two servo readers reading from one of the first and second servo tracks and one range being defined by servo read signals produced by one of the N servo readers reading from the first servo track and a different one of the N servo readers reading from the the second servo track.

2. A magnetic tape drive comprising:

a magnetic tape medium having
- a plurality of ranges each having a plurality of parallel data tracks, and
- at least two laterally spaced parallel servo tracks formed of a series of transitions in magnetic moment of the magnetic tape medium, the transitions representing servo bursts, the servo bursts of one servo track having the same phase and polarity as corresponding servo bursts of at least one other servo track;

a magnetic head proximate the magnetic tape medium, the magnetic head comprising:
- a plurality of laterally spaced servo readers for sensing the servo bursts, the servo readers being arranged so that two laterally adjacent servo readers are capable of sensing servo bursts along a single one of the servo tracks and two laterally remote servo readers are capable of sensing servo bursts along respective different servo tracks, and
- a plurality of transducing heads for reading and/or writing data from and/or to separate data tracks in each range on the magnetic tape medium; and a servo loop responsive to the servo read signals produced by the servo readers sensing servo bursts to position the magnetic head so that the plurality of transducing heads transduce with the magnetic tape medium at one of the plurality of ranges, at least one of the ranges being defined by servo read signals produced by the two laterally remote servo readers.

3. The magnetic tape drive of claim 2, wherein there are two servo tracks and the number of ranges is equal to 2N−1, where N is the number of servo readers.

* * * * *